M. P. SMITH.
Drier.
No. 107,417.
3 Sheets—Sheet 2.
Patented Sept. 13, 1870.
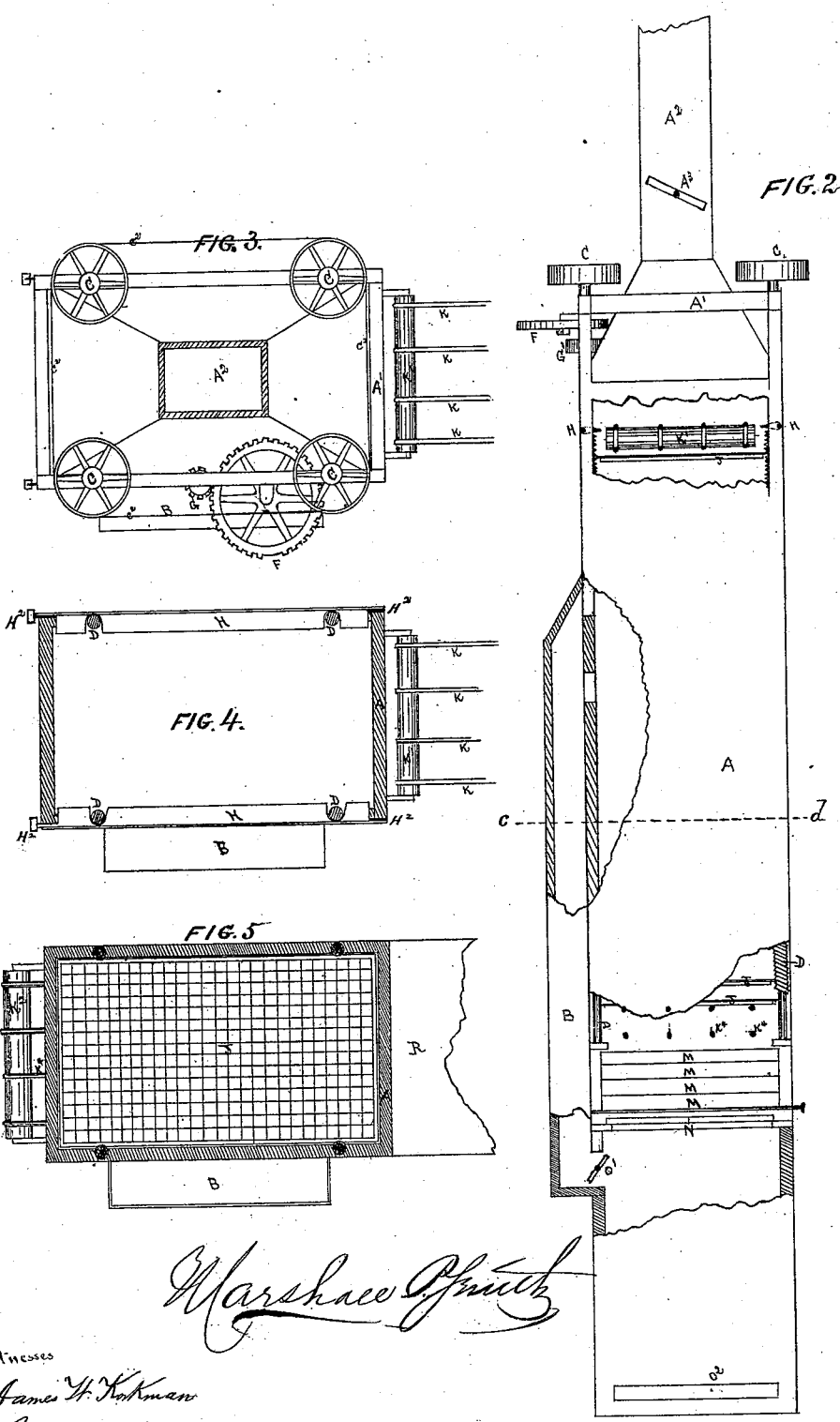

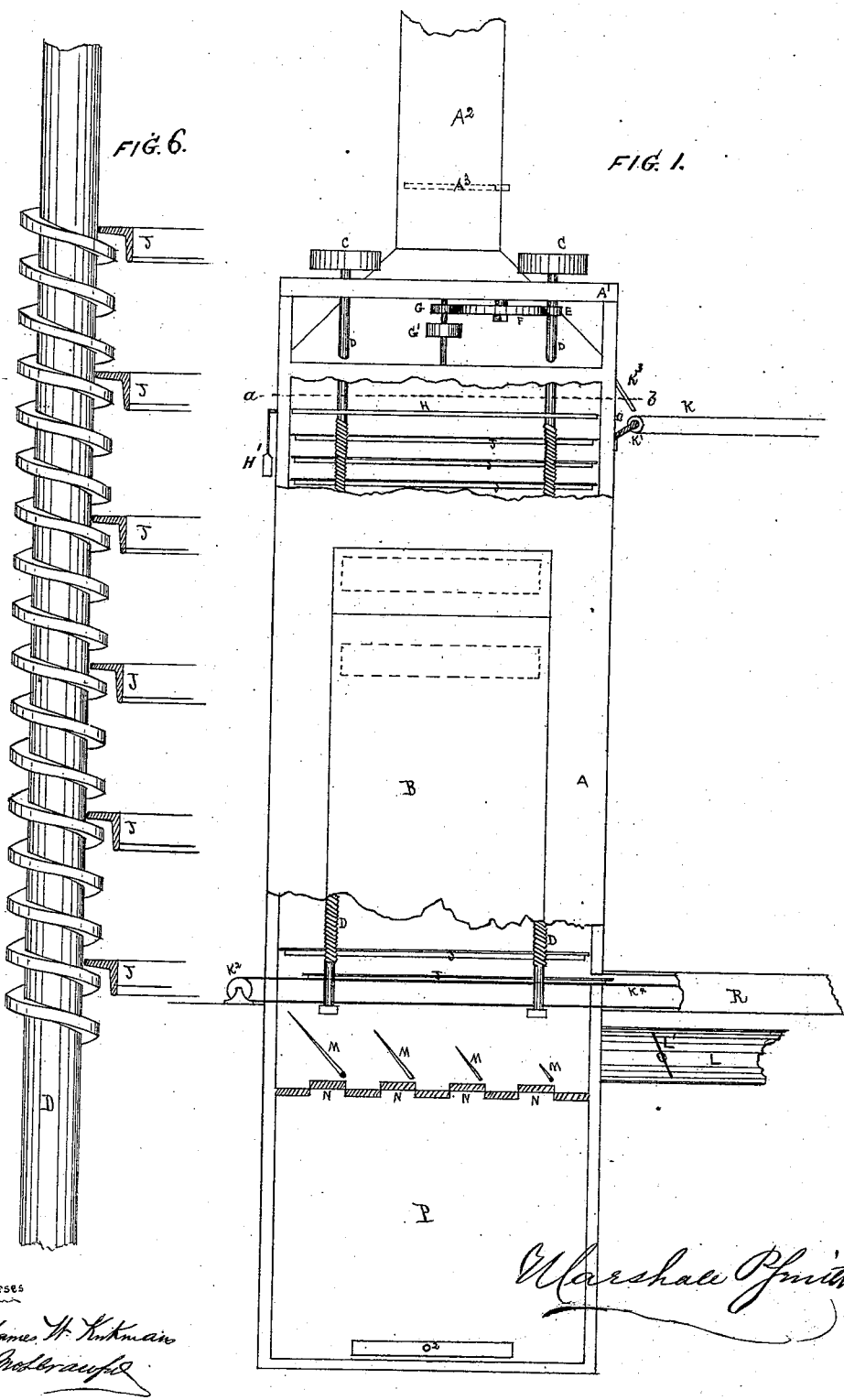

M. P. SMITH.
Drier.
No. 107,417.
3 Sheets—Sheet 3.
Patented Sept. 13, 1870.
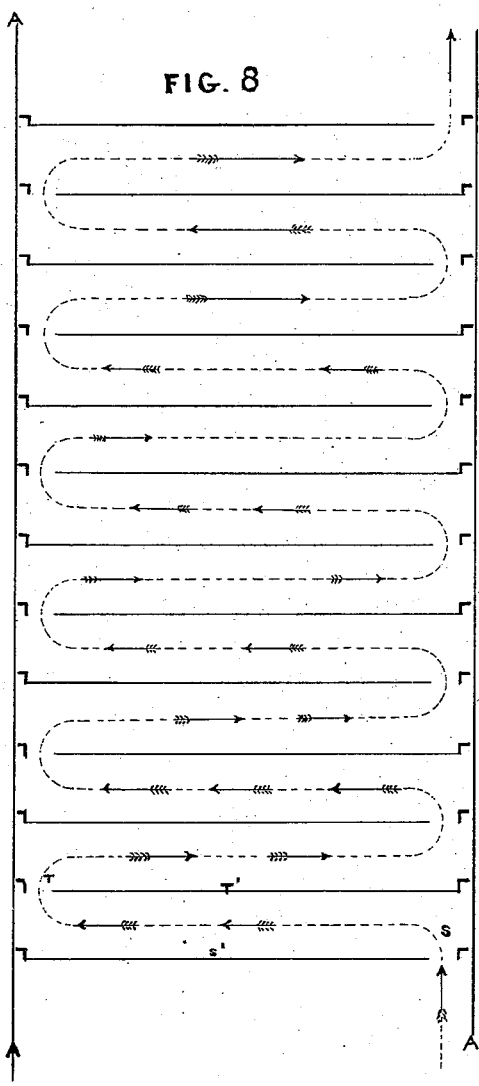
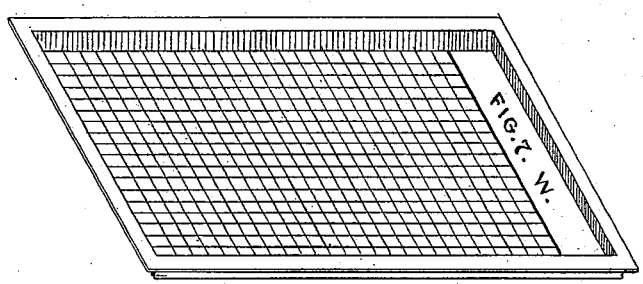

UNITED STATES PATENT OFFICE.

MARSHALL P. SMITH, OF BALTIMORE, MARYLAND.

IMPROVEMENT IN DRIERS.

Specification forming part of Letters Patent No. 107,417, dated September 13, 1870.

I, MARSHALL P. SMITH, of Baltimore, in the county of Baltimore and State of Maryland, have invented a new and Improved Drier, of which the following is a specification:

The first part of my invention consists of a vertical chamber or tower, in the interior of which are four vertical screws, the threads of which form supports for a series of trays, which receive a rising or falling motion by the revolution of the vertical screws. These trays are made to fit the chamber as closely as possible and yet allow free motion, so that the heated air, which is introduced at the lower end of the chamber, will be caused to pass through all of the trays in succession before escaping from the top of the chamber, being thus brought into contact with all the drying substances and enabled to absorb a very large quantity of the moisture; and this is an important feature of the invention, for if the warm air is permitted to escape before it has become saturated a very great waste of heat and power is incurred. These trays I prefer to make of iron-wire cloth of as large mesh as the substance to be dried will allow; but they may be made of perforated metal or of wood. When the substance to be dried is of an open or porous nature, or in pieces of such size that the mesh or perforations in the tray can be large, the air will rise freely through the trays; but when the substance is small and lies compact, such as grain, these large open meshes cannot be used; and when liquids are to be evaporated, they must be held in pans through which the air cannot pass. I therefore make my trays with a portion of the bottom at one end removed, as shown in Fig. 7, W, and in placing the trays in the tunnel these spaces are in reversed order, as shown in Fig. 8. The heated air, entering at the bottom, passes up through the space S, over tray S', through space T, over tray T', and so on, as shown by the dotted arrow-line. The rames are made of iron or wood, and whereas the air, after passing through a considerable number of trays, will be reduced in temperature and its absorbing power weakened, a pipe or channel, B, is provided to convey fresh hot air to the upper portion of the chamber to hasten the drying. This channel may be of wood or metal, and may start from the lower chamber, as per drawing, or may branch off from the blast-pipe L.

The second part of my invention relates to the mode of entering and removing the trays by means of a combination of endless chains or ropes, $K^1$ and $K^4$ and vibrating flanges H.

The third part of my invention relates to the mode of introducing and regulating the heated air.

Figure 1 is an elevation of one side of the chamber or tower, cut away in places to exhibit the interior arrangement. Fig. 2 is an elevation of the front of the chamber, also partly cut away for same purpose. Fig. 3 is a view of the top of the chamber, showing the pulleys and gearing which rotate the screws. Fig. 4 is a section through line $a\ b$, showing the operation of the vibrating flanges and endless chains. Fig. 5 is a section through line $c\ d$. Fig. 6 shows the vertical screws in perspective and the trays in section.

Similar letters indicate corresponding parts.

A A is the frame of the chamber or tower, which may be constructed of brick, lumber, or other materials. Its size will depend upon the nature of the substance to be dried, and its height should be much greater than its diameter. It should be placed in a building of three or more stories in height, to allow of easy access to the upper and lower ends, and it will be found most economical to make it twenty-five to fifty feet high and four to eight feet in diameter. A chimney, $A^2$, with a damper, $A^3$, is provided to increase and regulate the draft.

The lower portion of the chamber, from the ends of the screws downward, should be placed in the cellar of the building, and in the space marked P, Fig. 1, a furnace, such as is used for heating dwellings, is placed, cold air being admitted through the opening $O^2$.

Above the furnace are valves or dampers N N, which, when fully open, give free escape to the heated air into the chamber above, and by closing regulate the quantity to any degree. L is a pipe entering the chamber above these dampers, having a valve, L'. Through this pipe heated air is forced by a fan into the chamber, and, impinging on the the deflector M M, is deflected upward. These deflectors are of increasing superficial area, and vibrate on journals at their lower edges, and by adjusting these the hot air from the fan can be uniformly distributed over the whole chamber.

The hot blast and the furnaces can be used together or separately, as required, and when the blast is not used the deflectors may be dispensed with.

D D are large vertical screws, having a long pitch and deeply-cut thread, to give sufficient hold to the edges of the trays, as shown in Fig. 6, J J. The lower ends of these screws rest in steps securely fastened to the sides of the chamber, and they are also steadied by guides at suitable distances to keep them from swaying. The upper ends of these screws carry pulleys $c\ c$, around which passes a belt, $c^2$, Fig. 3, giving them a simultaneous motion. Gearing may be substituted for these pulleys; but the power required is small, and the belt will do the work. The screws rest in journals fastened to the framing $A^1$.

The upper part of the thread of the screw D is removed from a point about an inch below the surface of the flanges H to the end, in order that the tray may be entered easily and not engage with the thread until the flange is lowered, and the lower end of the screw is also similarly reduced, in order that, when the tray reaches the end of the thread, it may drop or rest upon the carrier $K^4\ K^2$ and be withdrawn from the chamber.

On one of the screws is a small pinion, E, engaging in a large spur-wheel, P, which also engages in pinion G on a counter-shaft, which receives motion from a pulley, $G'$.

From the spur-wheel F one or more teeth are removed, so that, whereas the pulley $G'$ and pinion G are in constant motion, the spur-wheel F will revolve only so far as the teeth are continuous, and when the vacant space is reached motion ceases in the vertical screws. By this device the trays can be introduced without accident while the screws are at rest, and by varying the diameter of the spur F, and consequently the number of revolutions which the screws will make before stopping, the distance between the trays may be regulated at pleasure.

The carrier $K^4\ K^2$ is formed of ropes or chains and rollers, like the upper one, and may be extended to the packing-room or elsewhere through the covered channel R.

K K are endless ropes or chains passing over roller $K^1$ close to the front of the chamber, and also over similar rollers at convenient distances from the first. These ropes receive continuous motion from pulleys not shown.

H H are flanges or bars vibrating on journals $H^2$, which project outside the chamber, and on one end of each flange are weights $H^1$, attached at right angles to the face of the flanges, which serve to keep them level until the tray is properly entered and rested upon them.

$K^3$ is a narrow door, which is raised to allow the tray to enter, and then closed.

In operation, the tray is placed on the ropes K, which carry it into the chamber and over the flanges H, which are depressed by the weight of the tray, or by moving the weighted levers until the tray rests upon the thread of the vertical screw.

When one tray has been placed in position the spur F is moved by hand or a simple lever (not shown) far enough for the teeth to engage in pinion $G'$, when the screws at once revolve till F has made one full revolution and stops. Another tray is then introduced, motion communicated a second time, and so on without intermission.

Having now described my invention, what I claim as new, and desire to secure by Letters Patent, is—

1. The arrangement of a series of trays resting in the threads of vertical screws, and receiving a falling or rising motion by the revolution of those screws in a chamber or tower supplied with a current or currents of hot air, substantially in the manner shown and described.

2. The arrangement of a series of trays or platforms receiving motion from the revolutions of vertical screws in a vertical drying-chamber, when so constructed and arranged that the current of air shall pass over each tray in succession, in the manner and for the purpose substantially as described.

3. The vibrating flanges H, when used in combination with the vertical screws, in the manner and for the purpose substantially as described.

4. The carriers K $K^1\ K^2\ K^4$, when used in combination with the vertical screws and flanges, in the manner and for the purposes substantially as described.

5. The vertical screws D, when used in combination with the vertical chamber A, for the purpose of raising or lowering trays, in the manner and for the purpose set forth.

6. The deflectors M M and dampers N N, when constructed in the manner and for the purposes substantially as described.

7. The arrangement of pinions G and $G'$ and spur F, having one or more teeth removed, when used for the purpose of giving intermitting motion to the vertical screws, in the manner substantially as described.

MARSHALL P. SMITH.

Witnesses:
JAMES W. KIRKMAN,
W. G. BOWDOIN.